Feb. 9, 1932.  C. S. BRAGG ET AL  1,844,631
POWER ACTUATOR
Original Filed Sept. 8, 1927  2 Sheets-Sheet 1
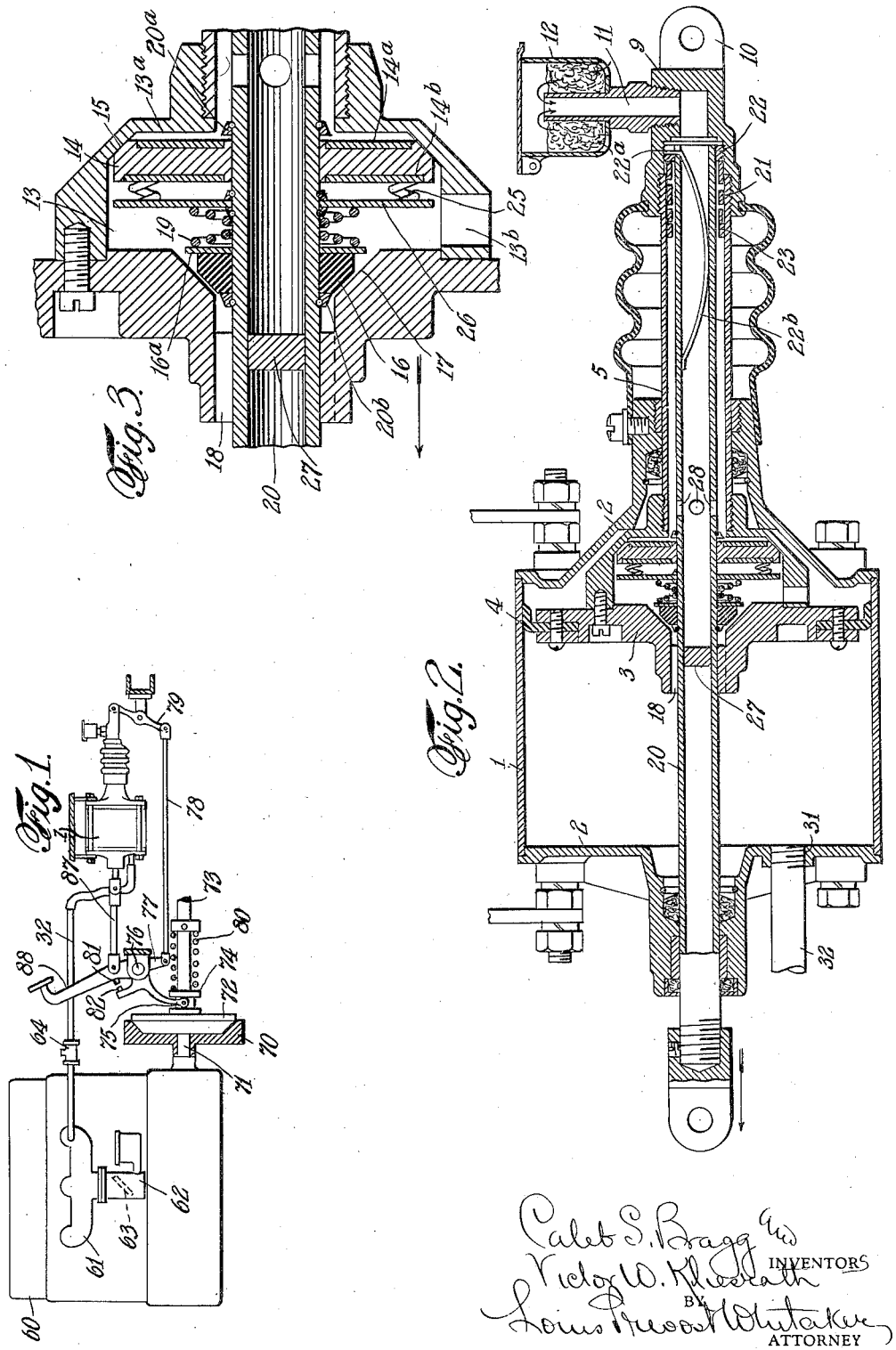

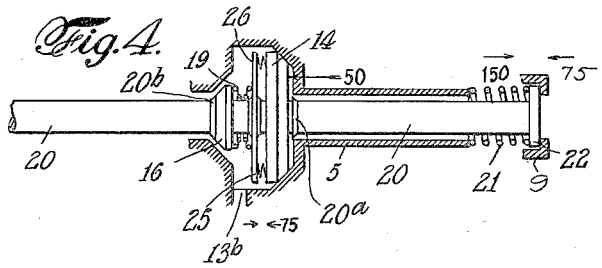
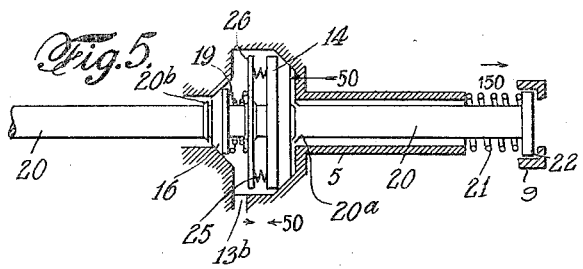
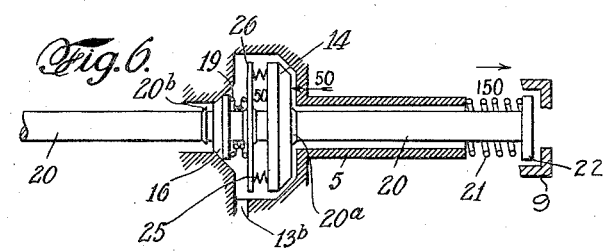
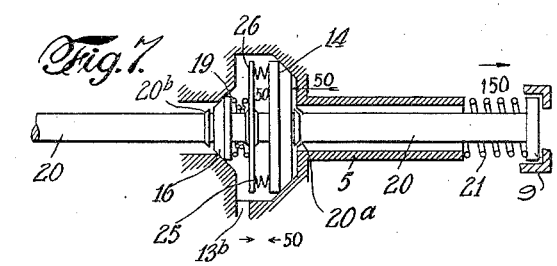
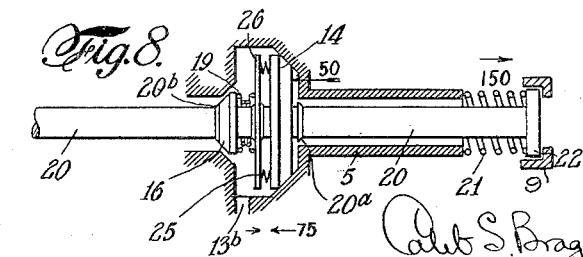

Patented Feb. 9, 1932

1,844,631

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed September 8, 1927, Serial No. 218,120. Renewed January 24, 1931.

Our invention consists in the novel features hereinafter described, reference being had to the accompanying drawings, which illustrate one embodiment of the invention selected by use for purposes of illustration, and the said invention is fully disclosed in the following description and claims.

Our invention is an improvement in power actuators, adapted especially for use in connection with automotive vehicles for effecting the movement of a part to be operated in one direction and permitting its return movement in the opposite direction by the operation of the power actuator under the control of operator operated parts connected with the controlling valve mechanism thereof, and has for its object the provision of means whereby the operator is enabled to determine by variations in the resistance to the operator operated part, as for example, by variations in the pressure against his foot where a pedal lever is employed to actuate the valve mechanism, the extent to which the part to be operated is being moved, both during its initial and its return movement. Our invention is particularly well adapted for the operation of the clutch mechanism of an automotive vehicle which is ordinarily held in engaged position by yielding means, and is moved into the disengaged position by compressing said yielding means and is permitted to gradually return to the engaged position.

According to our present invention, we provide controlling valve mechanism for the actuator, including a valve having opposite faces of substantially equal areas, one of which is subjected at all times to the higher fluid pressure, in a direction tending to open the valve, and the other of which is subjected to the fluid pressure within a portion of the cylinder of the actuator, said valve being operatively connected with a relatively movable valve actuating part connected with the operator operated part, and said valve being provided with yielding resistance means as a spring, or springs, acting upon it in a direction to seat it, interposed between said valve and a part connected with said valve actuating part, and having sufficient force to nearly counterbalance the atmospheric or other higher fluid pressure on the opposite face of the valve when the valve actuating part is in its normal or retracted position, in which it is held by yielding retracting means. The valve mechanism also includes a lower pressure valve for connecting the said portion of the cylinder with a source of lower pressure, which valve is normally held in open position when the valve actuating means is in its normal or retracted position. The valve actuating part will therefore be acted upon by the substantially constant factor of its retracting means, or springs, tending to move it in one direction, and the variable factors, to wit, the differential of fluid pressures on the opposite faces of the first mentioned valves, which will vary, in accordance with the pressure within the actuator cylinder, and the pressure of the said yielding resistance means, which will vary in accordance with the relative movement of the valve actuating part with respect to said valve, both of which variable factors tend to move the valve actuating part in a direction opposite to that in which its retracting means tend to move it. As a result of this construction, a variable differential of resistance will be applied to the valve actuating part and the operator operated part connected therewith so that the operator will be able to determine by the varying resistance of the operator operated part, to his foot for example, in the case of a pedal lever, the amount of force which is being applied to the part to be operated both in its initial and in its return movement with the same accuracy that he would be able to so determine if he were operating said part by physical force instead of by means of the power actuator. Our invention is particularly desirable in operating clutch mechanism in automotive vehicles for use on land, on water, or in the air, as it enables the operator to accurately determine when the clutch has been disengaged and to let in the clutch gradually by means of the power actuator with the utmost accuracy. Our invention also provides for a limited amount of lost motion between the operator operated part and a part connected with the part to be operated so that when the operator operated part has been moved sufficiently to operate the valve mechanism of the actuator the physical force of the operator can be applied to the part to be operated in addition to that of the power actuator or to operate said part to be operated by physical force alone in case of failure of power.

Referring to the accompanying drawings,

Fig. 1 is a diagrammatic view illustrating an embodiment of our invention in an automotive vehicle provided with an internal combustion engine for operating the clutch mechanism of the vehicle, the power actuator being connected with the suction passage of the engine as the source of lower fluid pressure and with the atmosphere as the source of higher fluid pressure.

Fig. 2 is an enlarged sectional view of the actuator shown in Fig. 1.

Fig. 3 is a still further enlarged sectional view of the valve mechanism of the actuator.

Figs. 4, 5, 6, 7 and 8 are a series of diagrammatic views illustrating different positions of the valve mechanism, and the differential of resistance applied to the operator operated part in each position.

In Figs. 1, 2 and 3 we have shown an embodiment of the invention in which the actuator is provided with valve mechanism located in the piston and constructed to normally maintain the piston submerged in vacuum when the piston is in its retracted position. 1 represents the cylinder of the actuator, fixed to the frame or chassis of the vehicle and in this instance closed at both ends by heads, 2, 2, and provided with a piston, 3, 3, having the usual gasket, 4. The piston is provided with a hollow piston rod, 5, at the outer end of which is a cap, 9, provided with a perforated ear, 10, for connecting the piston with the part to be operated, and this cap is conveniently provided with an inlet, 11, for the higher pressure fluid, which in this instance is air at atmospheric pressure, and said inlet is therefore conveniently provided with a dust collecting receptacle, 12. It is obvious, however, that the inlet aperture, 11, may be connected with a source of fluid pressure at higher than atmospheric pressure, if desired. The piston hub is provided with a valve chamber, 13, of relatively large diameter, to accommodate what is in this instance the higher pressure inlet valve, 14, adapted to engage a seat, 15, adjacent to one end of the valve chamber, leaving a portion thereof, indicated at 13a, adjacent to the outer face of the valve, 14, which communicates at all times with the air inlet or higher pressure inlet, 11. The valve, 14, may be formed of any suitable material, or of molded cork or rubber, suitably reinforced, as by metallic plates or rings, 14a, 14b, if desired, and has opposite faces of substantially equal areas, the exterior face being at all times subjected to atmospheric pressure, or other higher fluid pressure, and the inner face being at all times exposed to the pressure within the valve chamber, 13, and the portion of the cylinder in rear of the piston with which it communicates by an aperture, or apertures, 13b.

The valve, 14, has a central aperture which engages with a sealing fit, a valve actuating sleeve, 20, extending through a stuffing box in the forward head of the cylinder, and through the valve chamber, 13, and preferably through the hollow piston rod, 5, as shown. The sleeve, 20, is capable of relative movement with respect to the valve, 14, in both directions and is provided with a collar, 20a, in rear of the valve, and at such distance therefrom as to permit a certain amount of movement of the sleeve in the direction of the arrows, Figs. 2 and 3, before engaging the valve to effect the unseating thereof, when the piston and the valve actuating sleeve are in normal or retracted positions.

The valve, 14, is pressed in a direction toward its seat by yielding resistance means interposed between the valve and a part connected with the valve actuating sleeve and capable of exerting a variable pressure on the valve in accordance with the relative positions of the valve and seat. In the present instance we have shown a plurality of springs, 25, interposed between the inner face of the valve and a plate or disc, 26, rigidly secured to the sleeve, 20. When the sleeve, 20, is moved with respect to the valve so as to bring the collar, 20a, in contact with its outer face, the springs, 25, will exert a pressure on the inner face of the valve, substantially equal to or counterbalancing the pressure of the higher pressure fluid on the outer face of the valve when the inner face is subject to the maximum rarefication existing in said suction passage. When the valve, 14, is unseated, the force of the springs, 25, will be exerted in one direction against the disc, 26, and in the other direction against the collar, 20a, through the valve, 14, and as both the disc, 26, and collar, 20a, are secured to the valve sleeve, 20, these springs are practically nullified and exert no pressure on the valve sleeve in opposition to the spring, 21. When however, the valve, 14, is seated the movement of the sleeve, 20, with respect to the valve, 14, in a direction to move the collar, 20a, away from the outer face of the valve, will effect an increased compression of the springs, 25, and increase the pressure they exert on the valve. It will also be obvious that the reaction of these springs on the plate or disc, 26, will exert a corresponding pressure on the valve actuating sleeve, 20, tending to move it in the direction of the arrows, Figs. 2 and 3. It is also obvious that when a differential of fluid pressures exists on the opposite faces of the valve, 14, it will be continuously transmitted to the plate or disc, 26, and the valve actuating sleeve, through the springs, 25.

The valve chamber, 13, is also provided with a lower pressure valve, 16, in this instance a suction valve, engaging a valve seat, 17, which communicates through a passage, 18, in the piston hub, with the portion of the cylinder forward of the piston. The suction valve may be made of any suitable material, but is preferably made of molded cork or rubber, having a sealing fit around the valve sleeve, 20, and normally engaged by a collar, 20b, on the valve sleeve, located on the outer side of the suction valve and normally holding it in open position when the piston and the valve actuating sleeve are in their retracted position. Yielding means are provided for pressing the suction valve in a direction toward its seat, in this instance a spring, 19, interposed between the plate or disc, 26, and a metal plate, 16a, on the rear face of the valve.

The valve actuating sleeve, 20, is provided with retracting means which normally maintain the suction valve, 16, in open position, the resistance springs, 25, under increased compression, and the collar, 20a, a distance away from the outer face of the valve, 14, sufficient to permit the closing of the suction or lower pressure valve, 16, without effecting the opening of the higher pressure valve. In this instance we have shown the sleeve, 20, provided with a retracting spring, 21, capable of exerting a pressure on the sleeve, 20, in a direction opposite to that of the arrows in Figs. 2 and 3, considerably greater than that exerted in the opposite direction by the resistance springs, 25, and by the higher fluid pressure on the outer face of the valve, 14. This spring is conveniently interposed between a collar, 22, screwed on the end of the sleeve, 20, and a collar, 23, fixed to the interior of the hollow piston rod, 5, and holding the valve mechanism in its normal position, as illustrated in Figs. 2 and 3. In this position the rearward movement of sleeve, 20, under the action of spring, 21, is arrested by the engagement of the sleeve with the cap, 9, in which position the springs, 25, are held under a predetermined maximum degree of compression. The collar, 22, is locked in position by a pin, 22a, having a spring portion, 22b, extending within the sleeve to prevent the accidental displacement. The hollow sleeve, 20, is also preferably provided with an interior plug or closure, 27, forward of the valve chamber, and with inlet apertures, 28, in rear of said chamber and communicating with the portion, 13a, thereof, and with the higher pressure fluid inlet, 11.

The front head of the cylinder, 1, is provided with an aperture, indicated at 31, for the admission of the lower pressure fluid. In this instance we have shown this aperture connected by a suction pipe, 32, leading to a source of suction, which may be conveniently the suction passage of an internal combustion engine. In Fig. 1 we have shown the actuator installed in connection with an internal combustion engine for propelling an automotive vehicle, and arranged to operate the clutch mechanism thereof. In this figure, 60, represents the internal combustion engine, provided with an intake manifold, 61, forming part of the suction passage from a carburetor, 62, and provided with the usual throttle valve, 63. The intake manifold is shown connected with the suction pipe, 32, and said pipe may be provided with a check valve, if desired, indicated at 64. The piston rod, 5, of the actuator is shown connected with the movable member of a clutch mechanism, represented diagrammatically and comprising the main clutch member 70, secured to the engine shaft, 71, and the movable clutch member, 72, operatively connected with the transmission shaft, 73, and provided with a grooved collar, 74, engaged by a yoke, 75, pivotally mounted on an axis, 76, secured to the vehicle and provided with an operating arm, 77, connected with said yoke. The said operating arm, 77, is shown connected by a link, 78, with one end of a centrally pivoted lever, 79, secured to the vehicle as shown, the other end of which is operatively connected with the piston rod, 5, so that a movement of the piston of the actuator in the direction of the arrows, Figs. 2 and 3, will effect a separation of the clutch members, or a release of the clutch. The clutch members are normally held in engagement, frictionally, by means of the usual spring, indicated at 80, engaging the collar, 74. It will be understood that the particular form of the clutch is immaterial and that it may be of any usual or desired construction.

88 represents the operator operated part, which as shown in Fig. 1, is a pedal lever, pivotally mounted in this instance on the axis, 76, and movable independently of the yoke, 75, to a limited extent, the amount of lost motion between the pedal lever and the yoke, being limited in any desired manner, in this instance by a co-acting stop, 81, 82, located respectively on the pedal lever and on an arm connected with the yoke, 75. The pedal lever is connected by a link, 87, with the valve actuating sleeve, 20.

In describing the operation of our invention, it will be convenient to refer to the diagram presented in Figs. 4 to 8, inclusive, and to assign definite pressure values to the various parts to facilitate the understanding of our invention. It may, therefore, be assumed, for purposes of explanation, that the pressure exerted by the retracting spring, 21, upon the valve actuating sleeve, in a direction opposite that indicated by the arrows in Figs. 2 and 3, is equal to 150 pounds. It may also be assumed that the pressure of the higher pressure fluid, in this instance air at atmospheric pressure, exerted on the outer face of the valve, 14, is 50 pounds, when the inner face is subjected to the maximum rarefication existing in the suction passage, and it may also be assumed that the pressure exerted by the resistance springs, 25, on the valve, 14, in a direction toward its seat and in the opposite direction on the plate or disc, 26, and the valve actuating sleeve, when the collar, 20a, is in engagement with the valve, 14, and the springs, 25, are in their condition of maximum expansion, permitted by said collar, is substantially 50 pounds, thus substantially counterbalancing the higher fluid pressure when the valve, 14, is subjected to the maximum differential of pressures on its opposite faces, and that when the valve actuating sleeve is moved rearwardly with respect to the valve, 14, to the maximum extent, as indicated in Figs. 2 and 3, for example, and the resistance springs, 25, are compressed to the maximum extent, they will exert a pressure of 75 pounds on the inner face of the valve, 14, in a direction to seat it, and in the opposite direction upon the disc or plate, 26, and the valve actuating sleeve, 20.

In the diagrammatic Figs. 4 to 8 inclusive, we have indicated for convenience of reference the resistance which the operator must overcome at the pedal under the different conditions illustrated and which we term pedal resistance, by the initials "P. R." and the number of pounds, based upon the figures for spring pressures and differential of fluid pressures assumed for purposes of illustration and hereinbefore recited.

Assuming that the parts of the apparatus are in the released positions indicated in Figs. 2 and 3, and in the diagram Fig. 4, the spring, 21, has exerted its force of 150 pounds to the right Fig. 4, compressing springs, 25, to such an extent that they exert a pressure of 75 pounds on valve, 14, holding it seated, the other 75 pounds force of spring, 21, being supported by the engagement of the sleeve, 20, with the cap, 9, which in this instance forms a stop to limit the rearward movement of sleeve, 20. If the engine is running with the throttle valve closed or nearly closed, the suction valve, 16, being open, air will be exhausted from the cylinder on both sides of the piston and on the inner side of air inlet valve, 14, which will therefore be subjected to the maximum differential of fluid pressures of 50 pounds, tending to move the valve to the left, but being overcome by the pressure of spring, 25.

To effect an operation of the actuator, the operator will place his foot on the pedal lever and apply sufficient power to effect a movement of the valve sleeve away from the stop (cap, 9), thereby exerting an initial pressure of approximately 75 pounds. When the foot lever and sleeve, 20, move forward in a direction to close the suction valve, 16, the springs, 25, are gradually allowed to assume their maximum expanded position, reducing their pressure from 75 pounds to 50 pounds, the difference in pressure being gradually assumed by the foot, so that the reaction pressure which the operator must overcome, gradually increases from the initial 75 pounds to 100 pounds, as indicated in Fig. 5, in which the pedal resistance to be overcome is indicated. This movement of the foot lever and sleeve, 20, to the left in the drawings, has closed the suction valve and brought the collar, 20a, into engagement with the valve, 14. When the collar, 20a, engages the valve, 14, the springs, 25, will be held between the disc, 26, and collar, 20a, as before described and will cease to exert any effective pressure on the valve actuating sleeve, 20, in opposition to spring, 21, but in this position of the parts the differential of fluid pressures tending to push the valve, 14, to the left will be transmitted through the springs, 25, to the sleeve, 20.

The further movement of the foot lever and sleeve, 20, to the left, therefore, requires a pressure on the foot lever in excess of 100 pounds and will effect the opening of the air inlet valve, 14, as indicated in Fig. 6, thus admitting the higher pressure fluid, in this instance atmospheric air, into the valve chamber, 13, and through the passage, 13b, into the cylinder of the actuator in rear of the piston. This immediately begins to effect an equalization of pressures on the opposite faces of the air inlet valve, 14, and as the pressure in the cylinder and in the valve chamber on the inner face of the valve builds up, the differential of fluid pressures on the opposite faces of the valve decreases, gradually eliminating the force of 50 pounds, tending to move the valve sleeve, 20, to the left, which force is transferred to the pedal, increasing the pedal resistance which must be overcome by the pressure of the foot on the pedal in order to keep the valve, 14, open. The reactionary force which the operator must overcome will, therefore, gradually increase until pressures are equalized on opposite faces of the valve, 14, when the power of the actuator will be at maximum and the foot of the operator will be resisted by a reactionary pressure of 150 pounds, or in other words the full force of the spring, 21.

It will be understood that as soon as the pressure begins to build up in the cylinder, the piston of the actuator will begin to move forward, the pedal lever and the valve actuating sleeve moving forward therewith, and the power of the piston being exerted through the connections 79 and 78, lever, 77, and yoke, 75, to throw out the clutch against the resistance of its spring, 80. As more and more of the pressure of the higher pressure fluid on the outer face of the valve, 14, is neutralized, that is to say, as the differential of fluid pressures on the opposite faces of the valve, 14, decreases, the operator is required to exert more and more strength to overcome the force of the retracting spring, 21, to keep the valve, 14, open, as the pressure builds up in the cylinder and the movable clutch member is moved to disengaged position, thus enabling the operator to determine the extent to which the piston is exerting its power on the part to be operated. To let in the clutch and restore the parts to their normal released positions, the operator will release his pressure on the pedal lever, permitting the higher pressure inlet valve to seat, while still supporting the full force of the spring, 21. As soon as the valve seats and the collar, 20a, moves away from the outer face of the valve, the force of the springs, 25, amounting to 50 pounds, will be exerted on the valve actuating sleeve, 20, in a direction to the left to assist the operator in resisting the pull of the spring, 21, thus reducing the amount of pedal resistance which he must overcome to 100 pounds, as indicated in Fig. 7. At this time both valves, 14 and 16, will be closed. The further release of the pedal effects the opening of the suction valve, 16, and the withdrawal of the air or other higher pressure fluid previously admitted to effect the power stroke of the actuator, and the springs, 25, will be further compressed to 75 pounds, the reaction of which will be exerted against the disc, 26, and sleeve, 20, toward the left in Fig. 8, thus reducing the amount of pedal resistance which the operator's foot must overcome, gradually to approximately 75 pounds, and enabling the operator to feel the gradual letting in of the clutch, after which the rear or right hand end of the sleeve, 20, will come in contact with its stop, (cap, 9), which will assume this 75 pounds pressure, and the parts will be in the released position shown in Fig. 4, the piston returning to its normal position and the exhaustion of the cylinder and valve casing again raising the differential of fluid pressures on the air inlet valve, 14, to its maximum, i. e., 50 pounds, which, as in the initial position Fig. 4, is ineffective since it is overcome by the 75 pounds exerted in the opposite direction by the springs, 25.

The higher pressure fluid is continuously withdrawn from the cylinder on both sides of the piston, as the piston is returned to its normal position, as long as the suction or lower pressure valve remains open, and when the parts come to rest in retracted position, they will be, as shown in Figs. 2 and 3, and the pressure values will be as indicated in the diagram, Fig. 4, and as previously described.

It will be understood that the movement of the piston in both directions is completely within the control of the operator, and that the valve mechanism and valve actuating part are movable with and with respect to the piston, so that if the operator arrests the movement of the valve actuating part and pedal, at any point, a slight continuing or overtaking movement of the piston will effect relative movements between the piston and valve actuating sleeve, and arrest the movement of the piston, which can thus be held in any intermediate or interjacent position. It will also be understood that while we have described the differential of resistance to the foot of the operator at different points in the operation of the actuator, for the purpose of explaining our invention, that the increase and decrease of the differential of resistance during the forward stroke of the piston to throw out the clutch, for example, and the return movement of the piston to let the clutch in, respectively, will be gradual, so that the operator is enabled to determine by the resistance encountered by his foot, the extent of the power which is being exerted by the actuator at every point in the movement of the piston to throw out the clutch and to allow it to re-engage with the same accuracy as if he were actually moving the clutch himself by his own physical force, while the actual power applied to the operator operated part is derived from the actuator.

It will also be understood that the extent of relative movement or lost motion between the operator operated part and the yoke, 75, or other part connected with the part to be operated, which lost motion is in this instance limited by the positions of the stops, 81 and 82, permits the operation of the valve mechanism to control the actuator without bringing these stops into forcible contact or taking up the lost motion completely. It is obvious that by taking up this lost motion, by applying additional force to the pedal lever, or other operator operated part, the physical force of the operator could be applied to the part to be operated directly in addition to the force of the actuator, or in case of failure of power, to enable the operator to operate the parts to be operated by physical force alone. In the latter case the movement of the pedal lever to take up the lost motion would bring the valve mechanism into such position as to vent the cylinder and prevent any resistance being offered to the movement of the piston beyond the friction with the cylinder.

While we have shown the actuator arranged to be operated by a differential of fluid pressures obtained by atmospheric air working against suction or rarefication, in this instance obtained from the intake manifold of the engine, it will be understood that the actuator may also be operated with a higher pressure fluid at higher than atmospheric pressure working against suction or against atmospheric pressure, in which latter case the aperture 31, in the cylinder, would be connected with the atmosphere, and in such cases the retracting and resistance springs will be calibrated proportionately with respect to the differential of fluid pressures employed.

It will be noted that the area of the higher pressure valve is considerably greater than that of the passage or passages which it controls, and its size will obviously depend entirely upon the amount of resistance or reaction which it is desired to apply to the operator operated part and upon the maximum differential of the higher and lower fluid pressures upon which the operation of the actuator depends. As the suction or lower fluid pressure valve is also subjected to the maximum differential of fluid pressures when sealed, it is made no larger than necessary for the suction or lower fluid pressure passages which it controls, so that its operation will not affect appreciably the operator operated part, by reason of the differential of fluid pressures on said suction or lower pressure valve.

What we claim and desire to secure by Letters Patent is:—

1. In a power actuator, the combination of a cylinder and a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder, and movable with the piston, and controlling valves movable with respect to the valve casing, a valve actuating part movable with said piston and with respect to said valves, yielding retracting means connected with the valve actuating part, an operator operated part connected with the valve actuating part, and means for varying the differential of retracting force applied to the valve actuating part during the movement of the piston in both directions, to enable the operator to determine the amount of force applied to the part to be operated by the variations in resistance of the operator operated part.

2. In a power actuator, the combination of a cylinder and a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder and movable with the piston, and controlling valves movable with respect to the valve casing, a valve actuating part movable with said piston and with respect to said valves, yielding retracting means connected with the valve actuating part, an operator operated part connected with the valve actuating part, and means including a part having opposite faces of considerable area substantially equal exposed respectively to the higher fluid pressure and the pressure within the pressure portion of the cylinder on one side of the piston and constructed to apply the differential of fluid pressures thereon to the operator operated part in a direction opposite to the retracting means for varying the differential of retracting force applied to the operator operated part during the movement of the piston in both directions to enable the operator to determine the amount of force applied to the part to be operated.

3. In a power actuator, the combination of a cylinder and a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder and movable with the piston, and controlling valves movable with respect to the valve casing, a valve actuating part movable with said piston and with respect to said valves, yielding retracting means connected with the valve actuating part, an operator operated part connected with the valve actuating part, and means including yielding resistance means constructed to be placed under varying compression, by the operation of the valve mechanism to effect movements of the piston in both directions and to apply its variable pressure to the operator operated part, in a direction opposite that of said retracting means for varying the differential of retracting force applied to said operator operated part during the movement of the piston in both directions to enable the operator to determine the amount of force applied to the part to be operated.

4. In a power actuator, the combination of a cylinder and a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder and movable with the piston, and controlling valves movable with respect to the valve casing, a valve actuating part movable with said piston and with respect to said valves, yielding retracting means connected with the valve actuating part, an operator operated part connected with the valve actuating part, and means including a movable part having opposite faces of considerable area substantially equal exposed respectively to the higher fluid pressure and the pressure within the portion of the cylinder on one side of the piston, and yielding resistance means interposed between said movable part and a part connected with the operator operated part and having sufficient force to overcome the maximum differential of fluid pressures on said movable part, the pressures exerted on said movable part being applied to the operator operated part in a direction opposite to the retracting means for varying the differential of retracting force applied to the operator operated part during the movement of the piston in both directions to enable the operator to determine the amount of force applied to the part to be operated.

5. In a power actuator, the combination of a cylinder and a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder and movable with the piston, and controlling valves movable with respect to the valve casing, a valve actuating part movable with said piston and with respect to said valves, yielding retracting means connected with the valve actuating part, an operator operated part connected with the valve actuating part, and means including a movable part having opposite faces of considerable area substantially equal exposed respectively to the higher fluid pressure and the pressure within the pressure portion of the cylinder on one side of the piston, and yielding resistance means interposed between said movable part and a part connected with the operator operated part and having sufficient force to overcome the maximum differential of fluid pressures on said movable part, the pressures exerted on said movable part being applied to the operator operated part in a direction opposite to the retracting means, said valve actuating part having a relative movement with respect to said movable part, to vary the pressure exerted thereby, whereby the differential of retracting force applied to the operator operated part will be varied during the movement of the piston in both directions to enable the operator to determine the amount of force applied to the part to be operated.

6. In a power actuator, the combination of a cylinder and a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder and movable with the piston, and controlling valves movable with respect to the valve casing, a valve actuating part movable with said piston and with respect to said valves, yielding retracting means connected with the valve actuating part, an operator operated part connected with the valve actuating part, one of said controlling valves having opposite faces of considerable area substantially equal, one of which is exposed at all times to the higher fluid pressure, and the other of which is exposed to the fluid pressure within the pressure portion of the cylinder on one side of the piston, and means for applying the differential of fluid pressures on said valve to the operator operated part in a direction opposite to the retracting means for varying the differential of retracting force applied to the operator operated part during the movement of the piston to enable the operator to determine the amount of force applied to the part to be operated.

7. In a power actuator, the combination of a cylinder and a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder and movable with the piston, and controlling valves movable with respect to the valve casing, a valve actuating part movable with said piston and with respect to said valves, yielding retracting means connected with the valve actuating part, an operator operated part connected with the valve actuating part, one of said controlling valves having opposite faces of considerable area substantially equal, one of which is exposed at all times to the higher fluid pressure, and the other of which is exposed to the fluid pressure within the pressure portion of the cylinder on one side of the piston, yielding resistance means interposed between said valve and the valve actuating part, acting upon said valve in a direction and with sufficient force to seat said valve against the maximum differential of fluid pressures thereon, said resistance means transmitting their own pressure and the differential of fluid pressures upon said valve to said actuating part and operator operated part in a direction opposite to that of the retracting means for varying the differential of retracting force applied to the operator operated part during the movement of the piston in both directions to enable the operator to determine the amount of force applied to the part to be operated.

8. In a power actuator, the combination of a cylinder and a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder and movable with the piston, and controlling valves movable with respect to the valve casing, a valve actuating part movable with said piston and with respect to said valves, yielding retracting means connected with the valve actuating part, an operator operated part connected with the valve actuating part, one of said controlling valves having opposite faces of considerable area substantially equal, one of which is exposed at all times to the higher fluid pressure, and the other of which is exposed to the fluid pressure within the pressure portion of the cylinder on one side of the piston, yielding resistance means interposed between said valve and the valve actuating part, acting upon said valve in a direction and with sufficient force to seat said valve against the maximum differential of fluid pressures thereon when under maximum compression, said resistance means transmitting their own pressure and the differential of fluid pressures upon said valve to said actuating part and operator operated part in a direction opposite to that of the retracting means, the connections between the valve actuating part and the said resistance means and the said valve being relatively movable to effect variations in the compression of said resistance means, whereby the differential of retracting force applied to the valve actuating part and the operator operated part during the movement of the piston in both directions will be varied to enable the operator to determine the amount of force applied to the part to be operated.

9. In a power actuator, the combination of a cylinder, a piston therein provided with means for connecting it with a part to be operated, controlling valve mechanism, and means for connecting the cylinder with sources of higher and lower fluid pressures under the control of said valve mechanism, said valve mechanism including among its members a valve casing communicating with the cylinder, a lower pressure valve for connecting the cylinder with the source of lower pressure, yielding means for seating said valve, a higher pressure valve for connecting the cylinder with the source of higher pressure, a valve actuating part connected with said valve and constructed to permit one valve to be seated and thereafter open the other valve when moved in either direction and to permit both valves to be closed simultaneously, the higher pressure valve having opposite faces of considerable area substantially equal exposed respectively to the higher fluid pressure and to the pressure within the pressure portion of the cylinder, yielding resistance means interposed between the higher pressure valve and the valve actuating part and having sufficient force to hold said valve closed against the higher pressure fluid when said resistance means is under maximum compression, said resistance means transmitting its own pressure and the differential of fluid pressures upon said higher pressure valve to the valve actuating part in the direction of movement thereof to effect the opening of said higher pressure valve, yielding retracting means connected with the valve actuating part and exerting a pressure thereon greater than and in the opposite direction to that of the resistance means, and differential of fluid pressures, and an operator operated part connected with the valve actuating part, whereby the differential of retracting force applied to the valve actuating part and the operator operated part during the movement of the piston in both directions under the control of said valve mechanism will be varied by the variation in the compression of said resistance means and the variations in the differential of fluid pressures on the higher pressure valve, and enable the operator to determine the amount of force applied to the part to be operated.

10. In a pressure clutch operating mechanism for an automotive vehicle provided with an internal combustion engine having a suction passage, the combination of a power actuator comprising a cylinder and a piston therein, provided with means for connecting it with a clutch operating part, controlling valve mechanism, and means for connecting the cylinder on one side of the piston with the suction passage of the engine and with the atmosphere, under the control of said valve mechanism, said valve mechanism comprising among its members a normally closed valve controlling passages for effecting the operation of the piston in a direction to release the clutch when the valve is opened, said valve having oppositely disposed faces of considerable area substantially equal, one of which is exposed at all times to atmospheric pressure, and the other of which is normally exposed to the suction of said suction passage when the clutch is engaged and the position is in retracted position, an operator operated part connected with said valve for opening it, yielding resistance means interposed between said valve and the operator operated part and constructed to exert a perssure on said valve in a direction opposite to that exerted by the atmospheric pressure thereon, the atmospheric pressure on said valve and the pressure of said resistance means being transmitted to the operator operated part in a direction tending to open said valve, and retracting means connected with said operator operated part and acting thereon in the opposite direction with a greater force and providing a minimum differential of retracting force to be overcome by the operator in opening said valve, whereby the differential of retracting force applied to the operator operated part during the movement of the piston in both directions under the control of said valve mechanism will be varied to enable the operator to determine the amount of force applied to the clutch operating part.

11. In a pressure clutch operating mechanism for an automotive vehicle provided with an internal combustion engine having a suction passage, the combination of a power actuator comprising a cylinder and a piston therein, provided with means for connecting it with a clutch operating part, controlling valve mechanism and means for connecting the cylinder on one side of the piston with the suction passage of the engine and with the atmosphere, under the control of said valve mechanism, said valve mechanism comprising among its members a normally closed valve controlling passages for effecting the operation of the piston in a direction to apply the brakes when the valve is opened, said valve having oppositely disposed faces of considerable area substantially equal, one of which is exposed at all times to atmospheric pressure, and the other of which is normally exposed to the highest pressure within the cylinder, a valve actuating part connected with but movable with respect to said valve, for opening it, yielding resistance means interposed between said valve and the valve actuating part and constructed to exert a pressure on said valve in a direction opposite to and in excess of that exerted by the atmospheric pressure thereon when said valve is closed and the resistance means is compressed, the differential of fluid pressures on said valve and the variable pressure of said resistance means being transmitted to the operator operated part in a direction tending to open said valve, retracting means connected with said valve actuating part and acting thereon in the opposite direction with a greater force than the maximum differential of fluid pressures on said valve and the maximum force exerted by said resistance means, and an operator operated part connected with said valve actuating part, whereby a minimum differential of retracting force is applied to the valve actuating part and clutch operating part when the clutch is engaged and the piston is in retracted position, and the differential of retracting force applied to the operator operated part during the movement of the piston in both directions under the control of said valve mechanism will be varied to enable the operator to determine the amount of force applied to the clutch operating part.

12. In a pressure clutch operating mechanism for an automotive vehicle provided with an internal combustion engine having a suction passage, the combination of a power actuator comprising a cylinder and a piston therein provided with means for connecting it with a clutch operating part, controlling valve mechanism, and means for connecting the cylinder with the suction passage of the engine and with the atmosphere under the control of said valve mechanism, said valve mechanism comprising among its members a valve casing communicating with the cylinder and movable with the piston, and controlling valves movable with respect to the valve casing, a valve actuating part movable with said piston and with respect to said valves, an operator operated part connected with the valve actuating part, one of said controlling valves having opposite faces of considerable area substantially equal, one of which is exposed at all times to atmospheric pressure and the other of which is normally exposed to the highest fluid pressure within a portion of the cylinder on one side of the piston, yielding resistance means interposed between said valve and the valve actuating part, acting upon said valve in a direction opposite to and with a force in excess of that exerted by the atmospheric pressure thereon when said valve is closed and said resistance means is compressed, said resistance means transmitting their own pressure and the differential of fluid pressures upon said valve to said actuating part and the operator operated part, in a direction tending to open said valve, the other of said valves being of much smaller diameter and exerting no appreciable resistance to the movement of the operator operated part by reason of the differential of fluid pressures on said valve, and yielding retracting means connected with the valve actuating part and exerting a pressure in the opposite direction to and in excess of the maximum pressure exerted by said resistance means and the maximum differential of fluid pressures on said valve, whereby the differential of retracting force applied to the valve actuating part and the operator operated part during the movement of the piston in both directions will be varied to enable the operator to determine the amount of force applied to the clutch operating part.

13. In a pressure clutch operating mechanism for an automotive vehicle, provided with an internal combustion engine having a suction passage, the combination of a power actuator comprising a cylinder, a piston therein provided with means for connecting it with a clutch operating part, controlling valve mechanism, and means for connecting the cylinder on one side of the piston with the suction passage of the engine and for connecting the cylinder on the other side of the piston with the suction passage and with the atmosphere under the control of said valve mechanism, said valve mechanism comprising among its members a valve casing communicating with the cylinder and movable with the piston and air inlet and suction valves movable with respect to the valve casing, a valve actuating part movable with and with respect to said piston and valve, an operator operated part connected with the valve actuating part, said air inlet valve having opposite faces of considerable area, substantially equal, one of which is exposed at all times to atmospheric pressure, and the other of which is normally exposed to the highest fluid pressure within the valve casing, yielding resistance means interposed between said air inlet valve and the valve actuating part, and acting upon said valve in a direction opposite to and with a force in excess of that exerted by the atmospheric pressure thereon when said valve is closed and said resistance means is compressed by the relative movement of the valve actuating part with respect to said valve, said resistance means transmitting their own pressure and the differential of fluid pressures upon said valve to said actuating part and operator operated part in a direction tending to open said valve, and yielding retracting means connected with the valve actuating part and exerting a pressure in the opposite direction, in excess of the maximum pressure exerted by said resistance means and the maximum differential of fluid pressures on said air inlet valve, said section valve being of much smaller diameter than the air inlet valve and exerting no appreciable resistance to the movement of the operator operated part by reason of the differential of fluid pressures on said valve, whereby the differential of retracting force applied to the valve actuating part and the operator operated part during the movement of the piston in both directions under the control of said valve mechanism will be varied by the variations in the compression of said resistance means and the variations in the differential of fluid pressure on the air inlet valve to enable the operator to determine the amount of force applied to the clutch operating part.

14. In pressure clutch operating mechanism for an automotive vehicle provided with an internal combustion engine having a suction passage, the combination of a power actuator comprising a cylinder, a piston therein provided with means for connecting it with a clutch operating part, controlling valve mechanism, and means for connecting the cylinder on one side of the piston with the suction passage of the engine and for connecting the cylinder on the other side of the piston with the suction passage and with the atmosphere under the control of said valve mechanism, said valve mechanism comprising among its members a valve casing located in the piston, communicating with the cylinder in rear of the piston and provided with a suction port and an air inlet port, suction and air inlet valves for said ports respectively movable with respect to said casing in opposite directions, a valve actuating part movable with and with respect to said casing and connected with said valves by means for permitting one of said valves to close and for opening the other valve when moved in either direction and permitting both of said valves to be closed simultaneously, yielding means tending to seat said suction valve, said air inlet valve having opposite faces of considerable area, substantially equal, one of which is exposed at all times to atmospheric pressure, and the other of which is normally exposed to the highest fluid pressure within the valve casing and the portion of the cylinder connected therewith, yielding resistance means interposed between said air inlet valve and the valve actuating part and acting upon said valve in a direction to seat it with a force in excess of that exerted by atmospheric pressure thereon in the opposite direction when said valve is closed and said resistance means is compressed by the relative movement of the valve actuating part with respect to said valve, said resistance means transmitting their own pressure and the differential of fluid pressures upon said air inlet valve to said valve actuating part in a direction tending to open said air inlet valve, and yielding retracting means connected with the valve actuating part and exerting a pressure in the opposite direction in excess of the maximum pressure exerted by said resistance means and the maximum differential of fluid pressures on said air inlet valve, said suction valve being of much smaller diameter than the air inlet valve and exerting no appreciable resistance to the movement of the operator operated part by reason of the differential of fluid pressures on said valve, whereby the differential of retracting force applied to the valve actuating part and the operator operated part during the movement of the piston in both directions under the control of said valve mechanism will be varied by the variation in the compression of the said resistance means and the variations in the differential of fluid pressures on the air inlet valve, to enable the operator to determine the amount of force applied to the clutch operating part.

15. In pressure clutch operating mechanism for an automotive vehicle provided with an internal combustion engine having a suction passage, the combination of a power actuator comprising a cylinder, a piston therein provided with means for connecting it with a clutch operating part, and controlling valve mechanism located in the piston and comprising a valve casing connected with the cylinder on one side of the piston and provided with a suction port for connecting the portions of the cylinder on opposite sides of the piston, and with an air inlet port for connecting it with the atmosphere, oppositely disposed suction and air inlet valves in said casing for controlling said respective ports, means for connecting the portion of the cylinder connected with the suction port with the suction passage of the engine, a valve actuating part movable with and with respect to said piston and valves and connected with said valves by means for permitting one of them to close and for opening the other when moved in either direction and permitting both of said valves to be closed simultaneously, yielding means tending to seat said suction valve, said air inlet valve having opposite faces of considerable area, substantially equal, one of which is exposed at all times to atmospheric pressure, the other of which is normally exposed to the highest fluid pressure within the valve casing and the portion of the cylinder connected therewith, yielding resistance means interposed between said air inlet valve and the valve actuating part and acting upon said valve in a direction to seat it with a force in excess of that exerted by atmospheric pressure thereon in the opposite direction when said valve is closed and said resistance means is compressed by the relative movement of the valve actuating part with respect to said valve, said resistance means transmitting their own pressure and the differential of fluid pressures upon said air inlet valve to said valve actuating part in a direction tending to open said air inlet valve, and yielding retracting means connected with the valve actuating part and exerting a pressure in the opposite direction in excess of the maximum pressures exerted by said resistance means and the maximum differential of fluid pressures on said air inlet valve, and holding the air inlet valve closed and the suction valve open when the piston is in retracted position to submerge the piston in vacuum, said suction valve being of much smaller diameter than the air inlet valve, and exerting no appreciable resistance to the movement of the operator operated part by reason of the differential of fluid pressures on said valve, whereby the differential of retracting force applied to the valve actuating part and the operator operated part during the movement of the piston in both directions under the control of said valve mechanism will be varied by the variation in the compression of said resistance means and the variations in the differential of fluid pressures on the air inlet valve, to enable the operator to determine the amount of force applied to the clutch operating part.

16. The combination with a source of power having a part adapted to be continuously rotated, a rotatable part to be intermittently driven thereby, a clutch mechanism for connecting said parts, and an operating part therefor, of a fluid pressure actuator comprising a cylinder, a piston therein connected with said clutch operating part, and controlling valve mechanism for said actuator, said valve mechanism comprising among its members a normally closed valve controlling passages for effecting the operation of the piston, and a clutch operating part connected therewith, said valve having oppositely disposed faces of considerable area substantially equal, one of which is exposed at all times to the higher pressure fluid for operating the actuator, and the other of which is exposed to the fluid pressure in a portion of the cylinder on one side of the piston thereof, and operator operated part connected with said valve for opening it, yielding resistance means interposed between said valve and the operator operated part, and constructed to exert a pressure on said valve in a direction opposite to that exerted by the pressure fluid thereon, the fluid pressure on said valve and the pressure of said resistance means being transmitted to the operator operated part in a direction tending to open said valve, and retracting means connected with said operator operated part and acting thereon in the opposite direction with a greater force and providing a minimum differential of retracting force to be overcome by the operator in opening said valve, whereby the differential of retracting force applied to the operator operated part during the movement of the piston and the clutch operating part in both directions under the control of said valve mechanism will be varied, to enable the operator to determine the amount of force applied to the clutch operating part.

In testimony whereof we affix our signatures.

CALEB S. BRAGG.
VICTOR W. KLIESRATH.